Patented Aug. 16, 1927.

1,638,821

UNITED STATES PATENT OFFICE.

GEORGE BENTLEY BERGEN, SR., OF MILWAUKEE, WISCONSIN.

PLASTIC PROCESS.

No Drawing.  Application filed December 2, 1925. Serial No. 72,837.

The use of magnesium oxychloride as a cement, in combination with various fillers, or aggregates, under the names of Sorel cement, artificial marble, etc., has long been known as a useful material for flooring, roofing, wainscoting and the like. However, certain limitations are inherent in the product heretofore evolved that render it unfit for the production of articles such as vases, candlesticks, ash trays, napkin rings, buttons, etc. These limitations arise from the fact that air, or gas, cavities develop during the setting process which render the product unsightly and incapable of receiving a high polish; the appearance of cracks during the seasoning of the article after removal from the mold; the appearance of efflorescence on the surface, which destroys the beauty of the colors; and the impossibility of obtaining strong colors, such as blacks, blues, reds, greens in the final product, together with sufficient hardness when using formulæ providing for a large percentage of filler.

The elimination of all these obstacles, and the further advantage of being able to machine the material before it has hardened, producing at once a highly colored, beautifully veined and polished surface, is the object of my invention as hereinafter set forth.

My first departure from established practice consists in the use of a much weaker solution of magnesium chloride, preferably 17 to 19 degrees Baumé. Another departure is the discarding of all or nearly all fillers. A third variation is the substitution of a large proportion of coloring matter for the discarded filler. A fourth and perhaps, most important, point, is the time that is allowed to elapse between the various steps in the process.

With the foregoing and other objects in view, my invention, which may obviously be modified in various respects by those skilled in the art, and within the scope of the appended claims, consists in the composition of matter and method of preparing and using the same of which I now proceed to give a detailed example.

In the preferred embodiment of my present invention, I use only the very impure articles of commerce, that is, magnesium oxide (ground and calcined magnesite) and magnesium chloride. Having prepared a rather dilute solution of the latter, I use this to wet the oxide, making the mixture of the consistency of soup or cream. This I let stand for about one hour, or till the initial set, or thickening, begins to take place. I then stir the mixture, thinning with more magnesium chloride, if necessary, and divide it in several portions, according to the number of colors desired in the finished article. Coloring pigments, preferably alkali-proof colors, are then added in proportion by volume of about one to three or four and thoroughly incorporated by stirring, more magnesium chloride solution being added to keep the mixture like cream. These separately colored very fluid portions are then left quiescent for three to four hours, or until the mixture will barely slide from a spoon. In this condition, the colored masses will not intermingle when brought into conjunction, and I proceed to pile them in alternate layers on a platter or glass, shaking or rapping the support if I want thin-lined veining. This mass is now allowed to remain quiescent for a period of from four to six hours, or until the surface seems hard and unworkable to the touch. I now forceably remove the whole mass and by squeezing and kneading, render it plastic like modelling clay. The manner of kneading will determine to a large extent the character of the veining in the finished product. If the mass has stood too long and tends to crack and crumble, the moistening of the harder portions with magnesium chloride solution will soon render the entire mass pliable. I now mold this mass about a mandrel of the desired shape and size and let it stand for from one to ten hours when it can be turned in a lathe by using a sheet metal form, corresponding to the longitudinal cross section of the finished vase. The surface may be moistened, if necessary, from time to time, during the turning process, and the more forceably compressed about the mandrel the more free from blow holes and the higher will be the polish on the finished article. After removal from the lathe from twelve to twenty four hours must elapse before the mandrel can be removed easily. No abrasive is needed to obtain a pleasing polish, only a rubbing off with a cloth. The colors are very brilliant, the veining delicate and of exquisite beauty, and the product is hard and does not crack with age, and resists the action of hot or cold water, alcohol, ether, oils, greases and soaps.

It is to be understood that the above example is only typical of the ease with which a small article can be produced in a lathe; but the same advantage adheres to planing or carving of the surface or otherwise forming articles of beauty by removing the muddy-looking exterior surface.

I claim:

1. The method of making articles from a plastic compound consisting of combining a calcined and powdered metallic oxide and a metallic chloride solution to produce a fluid, then allowing a period of time to elapse for the initial setting, then dividing the compound into parts and adding a pigment to each separate part; then adding chloride solution to each part sufficient to maintain fluidity; then allowing time to elapse during which further setting takes place; then combining the differently colored portions into one mass; then allowing a period of time to elapse during which final setting takes place; then, before hardening takes place, kneading and working the mass to intermingle the colors and remove air or gas cavities; then molding the mass into a semblance to the final shape; and then removing the surface of the molded article to expose the coloring and to provide the finished shape.

2. The method of making articles from a plastic compound, consisting of combining ground and calcined magnesite and a magnesium chloride solution of approximately 18 degrees Baumé to provide a mixture having the consistency of cream, then allowing the mixture to stand for approximately one hour during which initial setting begins, then stirring the mixture and thinning with additional chloride solution, then dividing the mass into a plurality of parts, then adding a coloring pigment to each part and incorporating the same by stirring and adding chloride solution to maintain substantially the original consistency, then allowing a period of approximately three hours to elapse during which further setting takes place and the separate masses become sufficiently solid to be handled as such, then combining the differently colored portions in layers on a support, shaking or jarring the support to cause the surfaces of the separate portions to contact, then allowing the mass to stand for a period of approximately four hours and until the surface is relatively hard to the touch, then kneading the mass to produce the desired veining, then molding the mass into substantially the final form of the article to be produced, then removing the surface of the article to disclose the colors and provide the finished shape.

3. The method of producing vari-colored objects which consists in providing a fluid mixture of magnesite and magnesium chloride, permitting initial setting to take place, then adding coloring matter and chloride solution to separated portions of the mass, then allowing said separate portions to set until solidity replaces fluidity, then combining said separate portions in one mass, and then kneading the mass to distribute the colors without blending thereof, and then shaping the mass into articles for use.

4. The method of producing vari-colored objects, which consists in providing a water mixture of magnesite and magnesium chloride, permitting initial setting to take place, then adding coloring matter to separate portions of said mixture and adding chloride solution to maintain fluidity, then permitting further setting to take place until the separate portions have stiffened, then combining said portions in strata and permitting further setting to take place until the surface of the mass is hard to the touch but still plastic on the interior, then manipulating the mass to distribute the colors without blending thereof and then shaping the mass until hard and then removing the exterior surface.

In testimony whereof I have affixed my signature.

GEORGE BENTLEY BERGEN, Sr.